United States Patent
Lind et al.

(10) Patent No.: US 10,632,494 B2
(45) Date of Patent: Apr. 28, 2020

(54) ADAPTIVE HOT MELT FEED

(71) Applicant: Graco Minnesota Inc., Minneapolis, MN (US)

(72) Inventors: Robert J. Lind, Robbinsdale, MN (US); Matthew R. Smith, Minneapolis, MN (US); Nicholas P. Peterson, Coon Rapids, MN (US); Benjamin R. Godding, St. Cloud, MN (US); Mark J. Brudevold, Fridley, MN (US); Matthew R. Theisen, Woodbury, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 0 days.

(21) Appl. No.: 15/901,167

(22) Filed: Feb. 21, 2018

(65) Prior Publication Data
US 2018/0236483 A1    Aug. 23, 2018

Related U.S. Application Data

(60) Provisional application No. 62/461,536, filed on Feb. 21, 2017.

(51) Int. Cl.
*B05C 11/10*     (2006.01)
*B05C 11/11*     (2006.01)
(Continued)

(52) U.S. Cl.
CPC .......... *B05C 11/101* (2013.01); *B05B 7/1404* (2013.01); *B05C 11/1042* (2013.01);
(Continued)

(58) Field of Classification Search
None
See application file for complete search history.

(56) References Cited

U.S. PATENT DOCUMENTS 5,065,695 A    11/1991   Baron et al.
5,182,704 A     1/1993   Bengtsson
(Continued)

FOREIGN PATENT DOCUMENTS

CN         1537033 A     10/2004
CN         1775377 A      5/2006
(Continued)

OTHER PUBLICATIONS

Customer Product Manual, "FillMaster™ Adhesive Feed System", Part 1030629C, Issued Jul. 2004, 47 pages.
(Continued)

*Primary Examiner* — Binu Thomas
(74) *Attorney, Agent, or Firm* — Kinney & Lange, P.A.

(57) ABSTRACT

An adaptive hot melt feed system includes a melt system, a feed system, a gas control device, a sensor, and a controller. The melt system includes a heated vessel. The feed system is configured to deliver a solid material to the vessel of the melt system for melting. The gas control device is configured to control a supply of gas provided to the feed system to drive the solid material from the feed system to the melt system. The sensor can be configured to detect an amount of material in the vessel of the melt system. The controller is in electronic communication with the gas control device and is programmed to signal the gas control device to vary the supply of gas to the feed system based on a fill metric determined by the controller.

18 Claims, 2 Drawing Sheets

(51) Int. Cl.
*B29B 13/02* (2006.01)
*B05B 7/14* (2006.01)
*B29C 65/00* (2006.01)
B65G 53/28 (2006.01)
B29C 65/48 (2006.01)
B05B 7/16 (2006.01)

(52) U.S. Cl.
CPC ............ B05C 11/11 (2013.01); B29B 13/022 (2013.01); *B05B 7/16* (2013.01); *B29C 65/4815* (2013.01); *B29C 66/87* (2013.01); *B65G 53/28* (2013.01)

(56) References Cited

U.S. PATENT DOCUMENTS

| | | | |
|---|---|---|---|
| 5,378,089 | A | 1/1995 | Law |
| 5,687,092 | A | 11/1997 | Bretmersky et al. |
| 5,791,830 | A | 8/1998 | Fort et al. |
| 5,995,909 | A | 11/1999 | Bretmersky et al. |
| 6,692,572 | B1 | 2/2004 | Allen |
| 7,006,896 | B1 | 2/2006 | Balmas et al. |
| 7,798,749 | B2 | 9/2010 | Charhut et al. |
| 7,886,935 | B2 | 2/2011 | Lasko |
| 7,967,168 | B2 | 6/2011 | Geier et al. |
| 8,167,516 | B2 | 5/2012 | Lasko |
| 8,383,991 | B2 | 2/2013 | Ganzer et al. |
| 9,120,115 | B2 | 9/2015 | Beal et al. |
| 9,156,053 | B2 | 10/2015 | Tix et al. |
| 9,304,028 | B2 | 4/2016 | Clark et al. |
| 9,427,768 | B2 | 8/2016 | Varga |
| 9,481,007 | B2 | 11/2016 | Rzonca et al. |
| 2006/0182887 | A1 | 8/2006 | Miller |
| 2011/0142552 | A1 | 6/2011 | Lasko |
| 2013/0105526 | A1* | 5/2013 | Ross .................... B29B 13/022 222/630 |
| 2013/0112279 | A1* | 5/2013 | Ross .................... B05C 11/1042 137/13 |
| 2013/0287503 | A1* | 10/2013 | Clark .................. B05C 11/1042 406/98 |
| 2014/0203040 | A1* | 7/2014 | Clark .................. B05C 11/1042 222/54 |
| 2014/0263452 | A1 | 9/2014 | Sebion et al. |
| 2015/0264745 | A1 | 9/2015 | Brudevold |
| 2016/0121359 | A1* | 5/2016 | Clark .................. B05C 11/1042 137/334 |

FOREIGN PATENT DOCUMENTS

CN 101941542 A 1/2011
WO WO2013/063288 A2 5/2013

OTHER PUBLICATIONS

Customer Product Manual, "FillEasy™ Adhesive Feed System", Part 7105215C, Issued Mar. 2005, 30 pages.
Operations and Service Manual 21-04, "HF Series Hopper Feeders", Models HF-2, HF-3, HF-4 and HF-7, Apr. 20, 2007, 61 pages.
Operations and Service Manual 21-11, "Model ADS-1 Dynafill™ System", Jan. 8, 2008, 52 pages.
Customer Product Manual, "ProBlue Fulfill™ Integrated Fill System", Issued Dec. 2008, 34 pages.
Extended European Search Report for EP Application No. 18157817.0, dated Jun. 22, 2018, 9 pages.
First Office Action from Chinese Application No. 2018101516307, dated Nov. 28, 2019, 16 pages.

* cited by examiner

ADAPTIVE HOT MELT FEED

CROSS-REFERENCE TO RELATED APPLICATION(S)

This application claims the benefit of U.S. Provisional Application No. 62/461,536 filed Feb. 21, 2017 for "Adaptive Hot Melt Feed" by R. Lind, M. Smith, N. Peterson, B. Godding, M. Brudevold, and M. Theisen.

FIELD OF INVENTION

The present invention relates generally to hot melt feed and dispenser systems and more particularly to an adaptive hot melt feed system.

BACKGROUND

Hot melt systems are commonly used in manufacturing assembly lines to apply an adhesive for the construction or closure of packaging materials, such as boxes, cartons, and the like. Conventional hot melt dispensing systems can include a material feed system and a hot melt dispenser system. The material feed system can deliver hot melt adhesive pellets to the hot melt dispenser system, which, in turn, heats and melts the adhesive pellets to produce a liquid adhesive. When a volume of melt material in the hot melt dispenser system reaches a minimum value, additional adhesive pellets can be delivered from the feed system to the hot melt dispenser system. In some systems, compressed gas can be used to drive the adhesive pellets from the feed system to the hot melt dispenser system using a venturi vacuum. The amount of adhesive pellets and the time required to deliver the adhesive pellets to the hot melt system can be critical for ensuring proper operation. For instance, a long delivery time can reduce the dwell time of the adhesive pellets in the hot melt system, which can prevent the adhesive pellets from reaching a melting temperature before being dispensed. Conversely, too much material delivered too fast can cause the melt chamber to overflow. In conventional hot melt systems, the pellet flow rate is controlled by an operator performing various calibration actions such as adjusting the pressure of the compressed gas to the venturi vacuum. This can typically take several fill cycles and guesswork to optimize. Once optimized, the operator must continue to monitor adhesive pellet delivery and adjust gas pressure to the venturi vacuum as multiple factors, including clogged air filters, low feed supply, and high ambient temperature or humidity, can cause a change in the adhesive pellet flow.

SUMMARY

An adaptive hot melt feed system includes a melt system, a feed system, a gas control device, a sensor, and a controller. The melt system includes a heated vessel. The feed system is configured to deliver a solid material to the vessel of the melt system for melting. The gas control device is configured to control a supply of gas provided to the feed system to drive the solid material from the feed system to the melt system. The sensor can be configured to detect an amount of material in the vessel of the melt system. The controller is in electronic communication with the gas control device and is programmed to signal the gas control device to vary the supply of gas to the feed system based on a fill metric determined by the controller.

A method of supplying a solid hot melt material to a melt system includes supplying a gas to a feed system to drive the solid material to the melt system, determining fill metrics, and signaling a gas control device to increase, decrease, or maintain the gas supplied to the feed system. Fill metrics are automatically determined by a controller, which signals the gas control device.

The present summary is provided only by way of example, and not limitation. Other aspects of the present disclosure will be appreciated in view of the entirety of the present disclosure, including the entire text, claims and accompanying figures.

Figure 1:
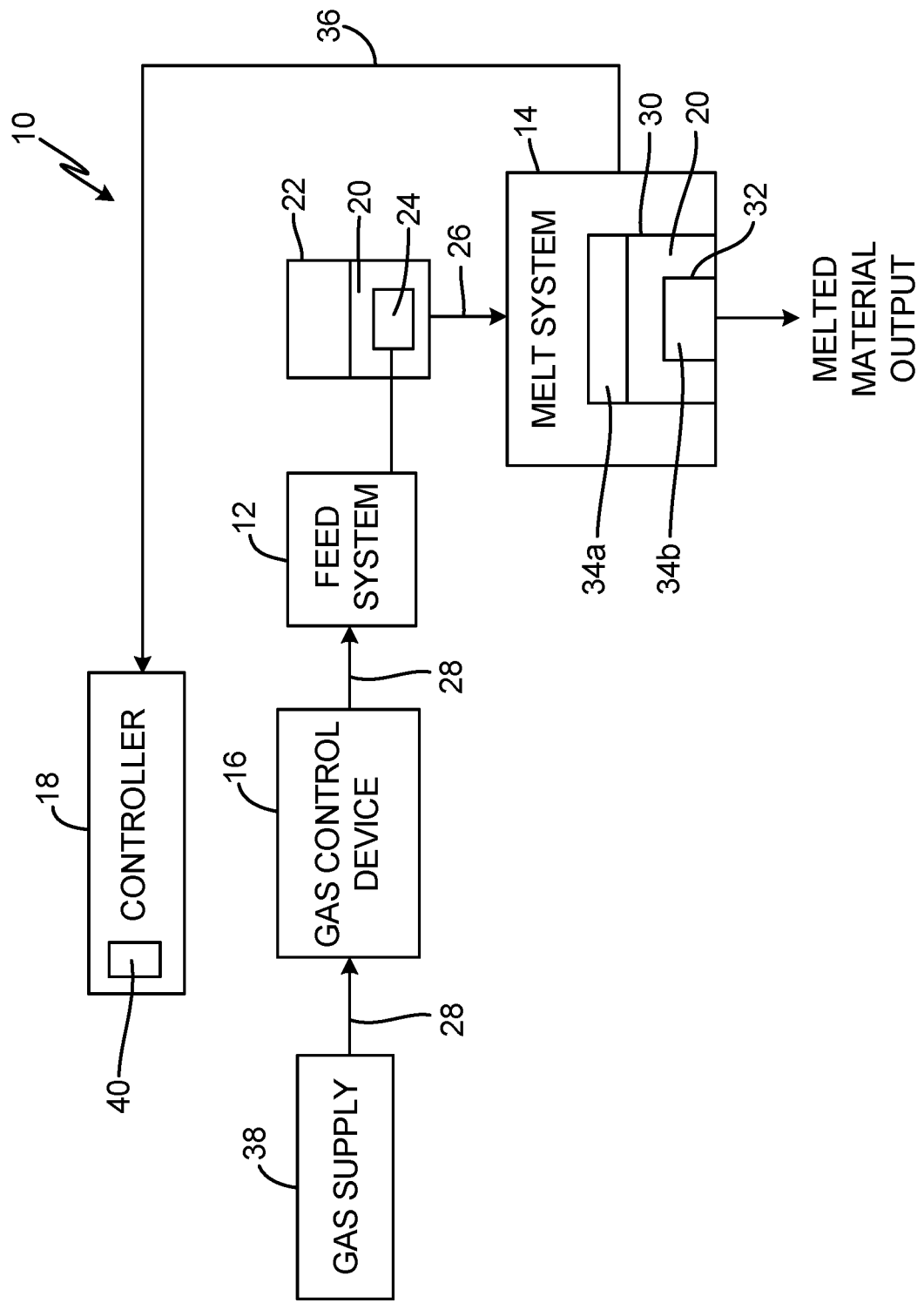
FIG. 1 is a schematic view of an adaptive hot melt feed system.

While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

The present invention is directed to an adaptive hot melt feed system that can automatically adjust a flow rate of solid hot melt material (e.g., adhesive pellets) from a feed system to a melt system for melting. The hot melt feed system can adapt to changing conditions (e.g., air supply, volume of feed material in a hopper, size of feed material, clumping of material due to increased temperature or humidity, etc.) that increase or decrease the flow of solid hot melt material from the feed system to the melt system. In this manner, the adaptive hot melt feed system can continuously optimize the time it takes to deliver the solid hot melt material to the melt system to ensure the solid hot melt material has a sufficient dwell time in the melt system to allow the solid material to melt prior to being dispensed. Prior art methods required an operator to routinely monitor the delivery of the solid hot melt material and optimize flow the solid hot material by manually increasing or decreasing a pressure of compressed gas supplied to a venturi vacuum used to drive the solid hot melt material to the melt system. The present invention automatically adapts to changing conditions and removes the need for a manually operated gas pressure regulator and operator calibration.

FIG. 1 is a schematic view of one embodiment of adaptive hot melt feed system 10. Adaptive hot melt feed system 10 includes feed system 12, melt system 14, gas control device 16, and controller 18. Feed system 12 is configured to deliver solid hot melt material 20 from solid material vessel 22 to melt system 14. Feed system 12 includes venturi vacuum 24 connected to feed line 26 for delivering solid hot melt material 20 to melt system 14. Compressed gas 28 is delivered to feed system 12 to drive venturi vacuum 24. A supply of compressed gas 28 is controlled by gas control device 16. Solid hot melt material 20 is delivered to melt system 14 for melting and dispensing. Melt system 14 includes melt vessel 30 for heating hot melt material 20 and pump 32 for dispensing melted hot melt material 20. One or more sensors 34*a*, 34*b* can be used to provide fill metrics data 36 to controller 18, which can include a duration of the feed interval and/or an amount of solid hot melt material 20 delivered in a feed interval or an amount of melted hot melt material 20 dispensed between feed intervals. Fill metric data 36 can be collected during each fill cycle and sent to controller 18. Based on fill metric data 36, controller 18 can cause gas control device 16 to adjust the supply of compressed gas 28 delivered to feed system 12 in the next fill cycle to increase or decrease the duration of the feed interval (i.e., the time it takes to deliver solid hot melt material 20 to melt system 14) and the power level at which the feed system operates.

Feed system 12 can be configured to deliver solid hot melt material 20 to melt system 14. Solid hot melt material 20 may be an adhesive material, including, for example, a thermoplastic polymer glue such as ethylene vinyl acetate (EVA) or metallocene, or other adhesive material as known in the art. Solid hot melt material 20 can be in the form of pellets of varying size and shape. The terms "solid hot melt material" and "solid material" are used interchangeably hereinafter to clearly distinguish the solid hot melt material from melted hot melt material dispensed from melt system 14. Likewise, the terms "melted hot melt material" and "melted material" are used interchangeably. Solid material 20 and melted material 20 are the same material in different forms (solid and liquid). Hot melt material 20 can exist in both solid and liquid form in melt system 14 and is, therefore, simply referred to as "hot melt material 20" when present in both forms.

Feed system 12 can be connected to solid material vessel 22. Solid material vessel 22 can be a cylindrical drum or bucket, hopper, or other suitable structure for containing a quantity of solid material 20. In some embodiments, solid material vessel 22 can include a mechanical agitator or other mechanism (e.g., compressed gas supply) for breaking up clumps of solid material 20 and/or assisting with delivery of solid material 20 into venturi vacuum 24. Venturi vacuum 24 can be positioned in solid material vessel 22 or at an outlet of solid material vessel 22. Venturi vacuum 24 can be positioned in a lower portion of solid material vessel 22 such that a flow of solid material 20 into venturi vacuum can be gravity-assisted. It will be understood by one of ordinary skill in the art that the structure of solid material vessel 22 and positioning of venturi vacuum 24 can be varied according to the application and that the present invention is not limited to the configuration disclosed.

Compressed gas 28 can be delivered from compressed gas source 38 to venturi vacuum 24 to create a vacuum, which can induce a flow of solid material 20 from solid material vessel 22, through feed line 26, and into melt system 14. Compressed gas source 38 can be compressed air or other gas suitable for the application delivered through a conduit suitable for transporting compressed gas. Feed line 26 can be a hose or passage having a diameter substantially larger than a diameter of solid material 20 to allow solid material 20 to freely flow through feed line 26. Feed line 26 can be of varying length depending on operator setup. Generally, a melt system configuration can have a feed line between 2 meters and 20 meters long, although lengths outside of this range are possible. The length of feed line 26 is generally limited by the capability of venturi vacuum 24 as driven by gas source 38. If feed line 26 is too long, venturi vacuum 24 may not be able to induce flow of solid material 20 through the full length of feed line 26 to melt system 14. Feed line 26 can connect to venturi vacuum 24 at one end and melt system 14 at an opposite end. Generally, feed line 26 can be oriented with respect to melt system 14 in a manner that allows gravity to partially drive the flow of solid material 20, without allowing a large quantity of solid material 20 to enter melt system 14 after venturi vacuum has stopped flow. As will be discussed further, supply of compressed gas 28 to venturi vacuum 24 can be shut off when a volume of hot melt material 20 in melt system 14 has reached a pre-defined fill capacity level. If a significant length of feed line 26 extends generally downward into melt system 14, solid material 20 that has entered feed line 26 before venturi vacuum 24 has been shut off, but is located in the downward extending portion of feed line 26, can enter melt system 14, causing the volume of hot melt material 20 in melt system 14 to exceed the fill capacity level. To avoid over-filling of melt vessel 30, feed line 26 can be oriented to allow at least some solid material 20 to remain in feed line 26 after gas supply to venturi vacuum 24 has been shut off.

Melt system 14 can include melt vessel 30 and one or more heating elements (not shown) for melting solid material 20 to form melted (liquid) material 20. Melt system 14 can also include pump 32 and a dispenser (not shown) for dispensing melted material 20 from melt system 14. Melt system 14 can be sized to hold a relatively small total material 20 volume (e.g., 0.5 liters) and can be configured to melt solid material 20 in a relatively short period of time (e.g., in continuous operation, the comparatively small volume of new solid material 20 added per fill may be melted and heated in a matter of seconds). Solid material 20 can be dispensed from feed line 26 into an inlet at the top of melt vessel 30, such that solid material 20 forms a surface layer of hot melt material 20 in melt vessel 30. In some embodiments, melt system 14 can include an air filter to remove dust and other particulates present with solid material 20 in feed line 26. Pump 32 can be configured to pump melted hot melt material 20 from melt vessel 30 to the dispenser (not shown) configured to selectively discharge melted material 20. Pump 32 can be a reciprocating pump in which a piston or plunger displaces a known volume of material, or can be any other type of positive displacement pump as known in the art.

Melt system 14 can be equipped with one or more sensors 34*a* configured to detect a volume level or height of hot melt material 20 present in melt vessel 30. Sensor 34*a* can be an ultrasonic sensor or other sensor (e.g., capacitive sensor, float sensor, etc.), as known in the art, suitable for detecting a height within melt vessel 30 to which hot melt material 20 extends (e.g., along an inner wall of melt vessel 30 or at a highest surface point of hot melt material 20). Sensor 34*a* can be configured to signal controller 18 when the level of hot melt material has reached a minimum height, indicating a need to resupply melt system 14 with solid material 20, and when the level of hot melt material has reached a maximum height, indicating a need to cease supply of solid material 20 so as to not exceed the capacity of melt vessel 30. The minimum and maximum values can be set based on the volume of melt vessel 30, the time required for melting solid material 20, and a discharge rate of melted hot melt material 20 from melt system 14. Controller 18 can be programmed to adjust the minimum value based on the dispensing rate. For example, during continuous use, the minimum level can be adjusted upward such that, the time between feed intervals may be significantly reduced. Due to the relatively small volume of melt system melt vessel 30, it is necessary that solid material 20 be delivered to melt system 14 in a time period of sufficiently short duration to ensure solid material 20 can be melted prior to being dispensed. The flow rate of solid material 20 from feed system 12 to melt system 14 can be adjusted by varying the supply of compressed gas 28 to venturi vacuum 24 using gas control device 16.

Gas control device 16 is located between compressed gas source 38 and feed system 12. Gas control device 16 can be located within hot melt system 14, on feed system 12, or elsewhere. In one embodiment, gas control device 16 can be a voltage to pressure (V to P) or current to pressure (A to P) electronic pressure regulator, in which the pressure of compressed gas 28 can be increased or decreased to increase or decrease, respectively, a velocity of solid material 20 through feed line 26. In an alternative embodiment, gas control device can be a solenoid, which can deliver compressed gas 28 to venturi vacuum 24 as a pulsed or pulse width modulated gas flow at a constant pressure to obtain a desired flow of solid material 20. A duration or width of pulses can be increased or decreased to increase or decrease, respectively, the velocity of solid material 20 through feed line 26. If a gas pressure supplied by operator-supplied compressed gas source 38 is too high, a duty cycle (proportion of time gas is on during a feed interval) can be decreased (e.g., pulse width decreased). If gas pressure is near a lower limit for optimal transfer of solid material 20, the duty cycle may need to be maximized such that the duration of time the gas is off is negligible (e.g., pulse width maximized). In such case, solenoid gas control device 16 functions similarly to a constant flow regulator. In both embodiments, gas control device 16 can be adjusted by controller 18 without operator input.

Controller 18 can be a processor capable of receiving, transmitting, and processing data. Controller 18 can include display 40 to provide the operator with fill metrics 36 provided by melt system 14 (e.g., sensors 34a, 34b) and/or determined by controller 18 for each fill cycle. As used herein, a "fill cycle" encompasses a period of time beginning with the supply of gas 28 to venturi vacuum 24 to fill melt system melt vessel 30 and ending with the next time sensor 34a signals controller 18 to refill melt vessel 30. Controller 18 can determine a duration of time it takes to fill melt system 14 with solid material 20 during a feed interval. As used herein, "feed interval" refers to the time from which the supply of gas 28 to venturi vacuum is turned on to the time the fill capacity level is detected and the supply of gas 28 to venturi vacuum is turned off. In some embodiments, sensor 34a can provide controller 18 with information needed to determine the amount of solid material 20 delivered to melt system 14 during a feed interval. Additional sensors 34b, such as a piston position sensor, can provide controller 18 with information needed to determine an amount of melted material 20 dispensed by melt system 14 between feed intervals. As used herein, the duration between feed intervals refers to the time from when controller 18 is signaled to stop filling melt vessel 30 to the time controller 18 is signaled to refill melt vessel 30 or the time from when the supply of gas 28 to venturi vacuum is turned off to cease the supply of solid material 20 to the time the supply of gas 28 to venturi vacuum is turned on to refill melt system 14. Controller 18 can signal gas control device to increase, decrease, or maintain the supply of gas 28 (i.e., increase/decrease gas pressure or duty cycle) to feed system 12 within the present feed interval or during the next feed interval to optimize feed performance. All data, including feed interval duration, duty cycle and/or gas pressure, and amount of solid material 20 delivered and/or melted material 20 dispensed can be collected and/or determined by controller 18 and is collectively referred to herein as fill metrics or fill metric data 36.

Figure 2:
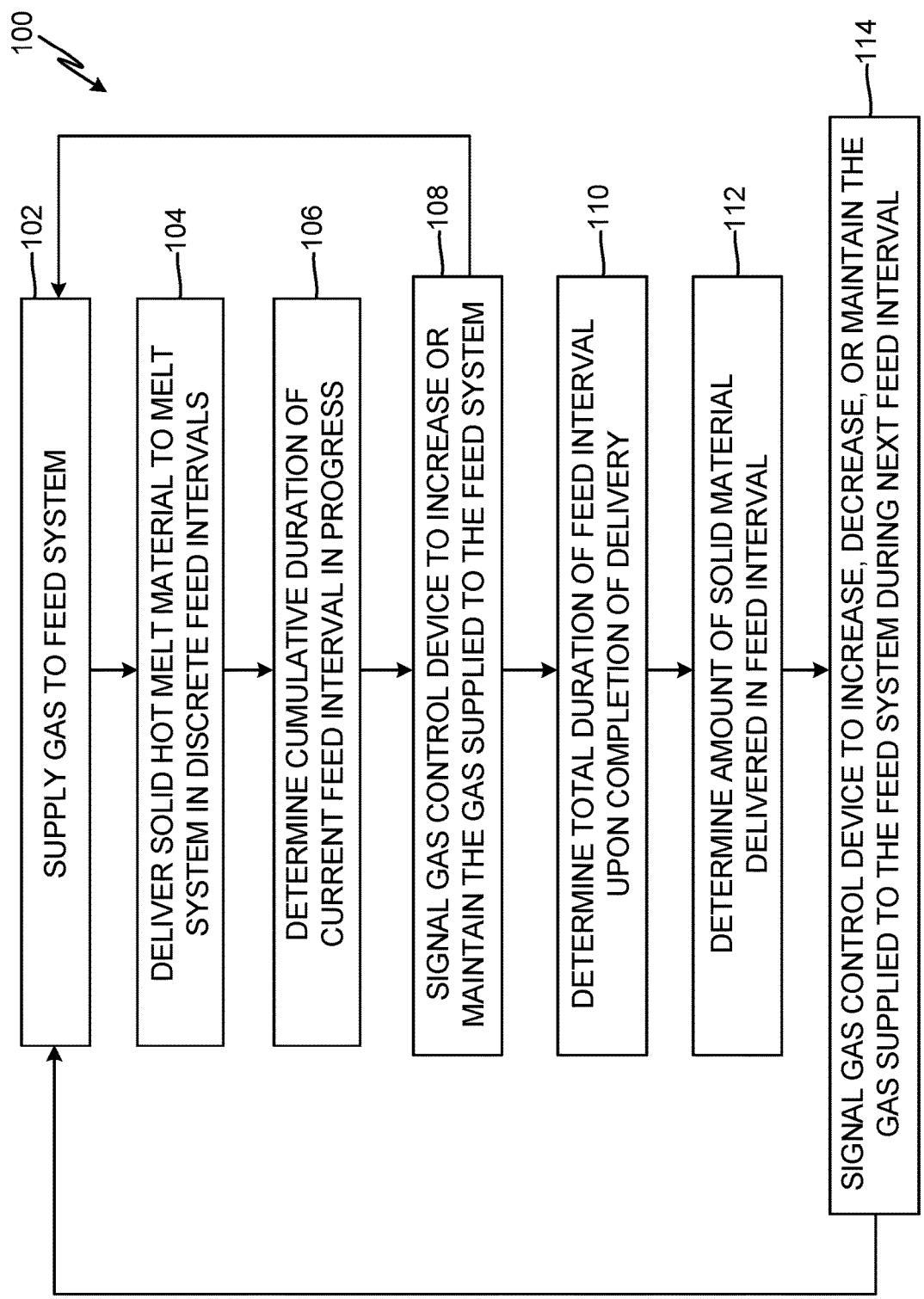
FIG. 2 is flow chart of a method of supplying a hot melt material to a hot melt dispenser system.

FIG. 2 shows a method 100 of supplying solid material 20 to hot melt system 14. In step 102, compressed gas 28 is supplied to feed system 12 via compressed gas source 38 and gas control device 16 to operate venturi vacuum 24. In step 104, solid material 20 is delivered to melt system 14 in a feed interval. As previously discussed, sensor 34a can be used to determine when a volume of hot melt material 20 in melt vessel 30 reaches the preset minimum level. This event can be transmitted to controller 18, which can then signal gas control device 16 to supply gas 28 to feed system 12. The same or additional sensor 34a can detect when enough solid material 20 has been delivered to melt vessel 30 of melt system 14 to reach the preset maximum fill level. This event can be transmitted to controller 18, which can then signal gas control device 16 to cease the supply of gas 28 to feed system 12. Any solid material 20 remaining in feed line 26 at the time gas 28 is shut off can remain in feed line 26, can be gravity-fed back to feed system 12, or can be gravity-fed or delivered by momentum to melt system 14, depending on the orientation of feed line 26 and velocity of solid material 20. Any solid material 20 that is delivered to melt system 14 after gas 28 has been shut off (after melt vessel 30 has reached the maximum fill level) contributes to the amount of solid material 20 delivered to melt system 14 during that feed interval.

In steps 106 and 108, controller 18 can determine a cumulative duration of a current feed interval in progress (i.e., how long it is taking to fill melt vessel 30) and signal gas control device 16 to increase or maintain the supply of gas 28 to feed system 12. If the cumulative duration is exceeding a maximum value (delivery is taking too long), controller 18 can signal gas control device 16 to increase gas pressure to feed system 12 or increase the duty cycle (i.e., amount of time gas flow is on in a pulse width modulated gas flow) to increase the velocity of solid material 20 through feed line 26 and thereby increase the feed rate. Increasing the velocity and feed rate of solid material 20 reduces the feed interval duration.

After a fill is complete, controller 18 determines, in step 110, the duration of the feed interval as defined from time at which gas 28 is supplied to feed system 12 to operate venturi vacuum to the time at which enough solid material 20 has been delivered to melt system 14 to reach a maximum fill level and the supply of gas 28 to feed system 12 has been shut off. An optimal feed interval for the disclosed embodiments having a 0.5 liter melt volume can be around five seconds; however, it will be understood by one of ordinary skill in the art that the feed interval duration can vary depending on the size of melt vessel 30, time it takes to melt solid material 20, and a discharge rate of melted material 20 from melt system 14. Although the efficiency of hot melt system 10 can be improved by delivering solid material 20 in discrete feed intervals, in alternative embodiments, system 10 may be configured to provide a continuous feed of solid material 20, in which case, a small amount of solid material 20 is continuously delivered to melt system 14 with a feed rate being continuously optimized by controller 18 based on fill metrics 36.

In step 112, controller 18 determines the amount of solid material 20 delivered to melt system 14 during the feed interval. The amount of solid material 20 delivered to melt system 14 can be determined by measuring a change in volume or level of hot melt material 20 (including both solid and melted material 20) in melt vessel 30. Alternatively, the amount of solid material 20 delivered can be calculated based on a number of piston strokes made to discharge melted material 20 between feed intervals. Although one or both methods can be used, the combination of the two provides greater accuracy. Level measurements can over- or under-quantify the amount of solid material 20 delivered depending on how solid material 20 enters melt vessel 30 and when and where measurements are taken. While some solid material 20 will sink into melted material 20 already in melt vessel 30, some may collect in solid form at the surface of the melted material 20. In this case, sensor 34a may detect a maximum fill level as indicated by the level of solid material 20, but the level of material in melt vessel 30 will decrease, independent of dispensing, as solid material 20 melts and air gaps between pellets of solid material 20 are removed. In some cases, solid material 20 can form a mound on the top center of the hot melt material in melt vessel 30, which will cause a variation in the level across the surface of hot melt material 20 and which can affect readings of sensor 34a. Additionally, some solid material 20 may enter melt vessel 30 after the maximum level has been detected and may not be included in the measurement depending on when the measurement is made. In contrast to melt vessel 30, a cylinder of pump 32 contains a known volume of melted material 20, which can be dispensed from melt system 14. As melted material 20 is dispensed, the level of hot melt material 20 in melt vessel 30 goes down until reaching the present minimum level, at which point, a new feed interval begins. The number of piston strokes (number of times the cylinder has been emptied) and/or partial piston strokes from the end of one feed interval to the beginning of the next feed interval can be used to calculate the total volume of hot melt material 20 delivered to melt system 14. In this case, overfilling or underfilling of melt vessel 30 is less likely to impact the accuracy of the measurement as both are accounted for in the measurement. In the disclosed embodiments, an optimal amount of solid material 20 delivered to melt system 14 can equate to about 100 milliliters of melted hot melt material 20 although this value can vary depending on use.

Several variables can affect the delivery of solid material 20. For example, a restricted air filter on melt system 14, an excessively long feed line 26, a long upward vertical extension of feed line 26, a low volume of solid material in container 20, and clumping of solid material 20 due to increased temperature or humidity can slow the feed rate of solid material 20. In contrast, an excessively short feed line 26 or long downward vertical extension of feed line 26 can increase the feed rate of solid material 20. A long duration feed interval can reduce the dwell time or amount of time solid material 20 has to melt in melt vessel 30 before being dispensed. A short duration feed interval can increase the potential for overfilling as a high velocity of solid material 20 typically associated with a short duration feed interval can cause additional solid material 20 to be delivered to melt system 14 after supply of gas 28 has been shut off. Based on the determined feed interval duration and amount of solid material 20 delivered in the feed interval, controller 18 can determine if the duration of the feed interval needs to be increased, decreased, or maintained to ensure optimal dwell time and complete melting of solid material 20. In step 114, controller 18 can signal gas control device 16 to increase, decrease, or maintain the supply of gas 28 to feed system 12. Controller 18 can signal gas control device 16 to increase gas pressure to feed system 12 or increase the duty cycle (i.e., amount of time gas flow is on in a pulse width modulated gas flow) to increase the velocity of solid material 20 through feed line 26 and thereby increase the feed rate. Increasing the velocity and feed rate of solid material 20 reduces the feed interval duration. Controller 18 can signal gas control device 16 to decrease gas pressure to feed system 12 or reduce the duty cycle to reduce the velocity of solid material 20 through feed line 26 and thereby reduce the feed rate. Reducing the velocity and feed rate of solid material 20 increases the feed interval duration.

Steps 102 through 114 are repeated for each fill cycle. Controller 18 can use fill metrics 36 from previous fill cycles to adaptively determine how to proceed with future fill cycles. Generally, controller 18 can be programmed to make gradual adjustments to gas supply 28 such that optimization occurs over several fill cycles instead of a single fill cycle. The gradual optimization can reduce the impact single, outlying, events can have on optimization. For example, if the operator, for any reason, manually increases the pressure of gas supply 28 for one fill cycle to an undesirable level, and thereby undesirably reduces the feed interval duration, controller 18 will only moderately adjust the supply of gas 28 during the next fill cycle based on the detected reduced feed interval duration. If the feed interval duration continues to be undesirably fast, controller 18 can make further and potentially greater adjustment to the supply of gas 28 in the following fill cycle. If, alternatively, the operator has manually reduced the pressure of the supply of gas 28, the gradual adjustment made by controller 18 prevents overcompensation. In this case, gradual adjustment prevents increasing the supply of gas 28 to a level that results in over-filling melt vessel 30.

All fill metrics data 36, including feed interval duration, duty cycle and/or gas pressure, and amount of solid material 20 delivered and/or piston strokes between feed intervals can be provided to the operator in display 40. Additionally, controller 18 can provide alerts to the operator through display 40 when the algorithm used to optimize fill metrics 36 indicates a need for operator action. For instance, controller 18 may be unable to optimize the feed of solid material 20 if feed line 26, pump 32, or the air filter in melt system 14 is clogged or if solid material vessel 22 is nearing empty, etc. In such cases, the operator may need to fix the problem preventing optimization before adaptive hot melt feed system 10 can be effectively operated. Such problems are not unique to adaptive hot melt feed system 10, but can be mitigated by the continuous display of fill metrics data 36 and alerts provided by controller 18.

Adaptive hot melt feed system 10 can largely eliminate the need for operator intervention in fill optimization. Because controller 18 can determine fill metrics 36 for each fill cycle and adapt to changing variables that affect the delivery of solid material 20 to melt system 14, it is not necessary for the operator to monitor delivery of solid material 20 and manually adjust the supply of gas 28 to feed system 12. No manual calibration or calculation is required to operate adaptive hot melt feed system 10.

SUMMATION

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transient alignment or shape variations induced by thermal, rotational or vibrational operational conditions, and the like. Moreover, any relative terms or terms of degree used herein should be interpreted to encompass a range that expressly includes the designated quality, characteristic, parameter or value, without variation, as if no qualifying relative term or term of degree were utilized in the given disclosure or recitation.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An adaptive hot melt feed system comprising:
   a melt system including a heated vessel;
   a feed system for delivering a solid material to the vessel of the melt system for melting;
   a gas control device configured to control a supply of gas provided to the feed system to drive the solid material from the feed system to the melt system;
   a sensor configured to detect when an amount of material in the vessel of the melt system reaches a fill capacity level; and
   a controller in electronic communication with the gas control device and programmed to determine a fill metric and to signal the gas control device to turn the supply of gas on and off and to vary the supply of gas to the feed system based on the fill metric;
   wherein the gas is supplied to the feed system during a plurality of feed intervals, wherein each feed interval is a discrete time period beginning when the supply of gas is turned on to drive the solid material to the melt system and ending when the fill capacity level is detected by the sensor and the supply of gas is turned off, and wherein the fill metric comprises a duration of at least one feed interval of the plurality of feed intervals, such that the supply of gas specified by the controller is responsive to changes in the plurality of feed intervals.

2. The system of claim 1, wherein the gas control device is a regulator selected from a group consisting of a voltage-to-pressure electronic regulator, a current-to-pressure electronic regulator, and a solenoid valve, wherein the solenoid valve is configured to deliver a pulse width modulated flow of gas to the feed system.

3. The system of claim 1, wherein the fill metric comprises a quantitative measure of solid material delivered to the melt system.

4. The system of claim 1, wherein the melt system further comprises:
   a pump configured to discharge a volume of melted material from the melt system, and wherein the fill metric comprises the volume of melted material discharged between feed intervals of the plurality of feed intervals.

5. The system of claim 1, wherein the controller sends a signal to the gas control device to increase or decrease the supply of gas to the feed system and wherein each signal sent to the gas control device is based on the fill metric determined in a preceding fill cycle, wherein a fill cycle extends from a start of one feed interval to a start of an immediately subsequent feed interval.

6. The system of claim 1, wherein the fill metric is a cumulative duration of a current feed interval and wherein the controller sends a signal to the gas control device to maintain or increase the supply of gas to the feed system based on the cumulative duration of the current feed interval.

7. The system of claim 1, wherein the controller is programmed to signal the gas control device to supply gas to the feed system when an amount of solid and melted material in the melt system vessel reaches a minimum value and is configured to signal the gas control device to stop the supply of gas to the feed system when an amount of solid and melted material in the melt system vessel reaches a maximum value.

8. The system of claim 7, wherein the sensor is configured to detect a surface level of solid and melted material in the melt system vessel.

9. The system of claim 1, wherein the controller sends a signal to the gas control device to increase or decrease the supply of gas to the feed system and wherein increasing and decreasing the supply of gas comprises increasing and decreasing a pressure of gas.

10. The system of claim 1, wherein the controller sends a signal to the gas control device to increase or decrease the supply of gas to the feed system and wherein increasing and decreasing the supply of gas comprises increasing and decreasing a duty cycle, wherein a pressure of the gas supplied remains constant.

11. A method of supplying a solid hot melt material to a melt system, the method comprising:
   supplying a gas to a feed system to drive the solid material to the melt system, the melt system including a heated vessel;
   using a sensor to detect when an amount of material in the heated vessel of the melt system reaches a fill capacity level; and
   determining a fill metric;
   signaling a gas control device to increase, decrease, or maintain the gas supplied to the feed system to control the delivery of solid material from the feed system to the melt system, wherein a controller is in electronic communication with the gas control device and is programmed to determine the fill metric and to signal the gas control device to turn the supply of gas on and off and to vary the supply of gas to the feed system based on the fill metric;
   wherein the fill metric is automatically determined by the controller and wherein the controller signals the gas control device to increase, decrease, or maintain the gas supplied based on the fill metric; and
   wherein the gas is supplied to the feed system during a plurality of feed intervals, wherein each feed interval is a discrete time period beginning when the supply of gas is turned on to drive the solid material to the melt system and ending when the fill capacity level is detected by the sensor and the supply of gas is turned off, and wherein the fill metric comprises a duration of at least one feed interval of the plurality of feed intervals, such that the supply of gas specified by the controller is responsive to changes in the plurality of feed intervals.

12. The method of claim 11, and further comprising determining at least one of an additional fill metric selected from the group comprising:
   a cumulative duration of the feed interval in progress and before solid material has been delivered to the melt system in an amount necessary to reach the fill capacity level; and an amount of solid material delivered to the melt system in the feed interval in the amount necessary to reach the fill capacity level.

13. The method of claim 12, wherein the controller:

determines optimized fill metrics; and compares the fill metrics previously determined to the optimized fill metrics; and signals the gas control device to increase, decrease, or maintain the gas supplied to the feed system during subsequent feed intervals to obtain the optimized fill metrics.

14. The method of claim 13, wherein increasing the gas supplied reduces the duration of the next feed interval and decreasing the gas supplied increases the duration of the next feed interval.

15. The method of claim 12, wherein the controller signals the gas control device to increase or maintain the gas supplied to the feed system during a current feed interval based on the cumulative duration of the feed interval in progress.

16. The method of claim 12, wherein increasing and decreasing the gas supplied to the feed system comprises increasing and decreasing a pressure of the gas supplied.

17. The method of claim 12, wherein the gas is supplied to the feed system as a pulse width modulated flow, wherein increasing and decreasing the gas supplied to the feed system comprises increasing and decreasing a duty cycle.

18. The method of claim 12, wherein measuring an amount of solid material delivered to the melt system comprises determining a volume of melted material discharged from a pump of the melt system.

* * * * *